United States Patent
Nishiyama et al.

(10) Patent No.: US 6,248,474 B1
(45) Date of Patent: Jun. 19, 2001

(54) COMPOSITE ELECTRODE FOR SECONDARY BATTERY AND PRODUCTION METHOD THEREOF

(75) Inventors: Toshihiko Nishiyama; Junko Kurihara; Gaku Harada; Koji Sakata; Shinako Okada, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/185,589

(22) Filed: Nov. 4, 1998

(30) Foreign Application Priority Data

Nov. 4, 1997 (JP) .................................. 9-302150

(51) Int. Cl.[7] .................................. H01M 4/60
(52) U.S. Cl. .................................. 429/213
(58) Field of Search .................. 429/212, 213; 252/182.1, 500; 427/58; 528/422

(56) References Cited

U.S. PATENT DOCUMENTS

| | | | |
|---|---|---|---|
| 4,544,615 | * | 10/1985 | Shishikura et al. . |
| 5,023,149 | * | 6/1991 | MacDiarmid et al. . |
| 5,776,370 | * | 7/1998 | Afzali-Ardakani et al. . |
| 5,783,331 | * | 7/1998 | Inoue et al. . |

FOREIGN PATENT DOCUMENTS

| | | | |
|---|---|---|---|
| 131829 A1 | * | 1/1985 | (EP) . |
| 55-161374 | | 12/1980 | (JP) . |
| 55-161375 | | 12/1980 | (JP) . |
| 55-161376 | | 12/1980 | (JP) . |
| 55-196568 | | 11/1984 | (JP) . |
| 59-196573 | | 11/1984 | (JP) . |
| 60-47379 | | 3/1985 | (JP) . |
| 61-200669 | | 9/1986 | (JP) . |
| 63-168974 | | 7/1988 | (JP) . |
| 1-030178 | * | 2/1989 | (JP) . |
| 64-30178 | | 2/1989 | (JP) . |
| 4-87258 | | 3/1992 | (JP) . |
| 4-147511 | | 5/1992 | (JP) . |
| 5-47211 | * | 2/1993 | (JP) . |
| 5-279458 | | 10/1993 | (JP) . |
| 5-283078 | | 10/1993 | (JP) . |
| 6-56989 | | 3/1994 | (JP) . |
| 6-124708 | * | 5/1994 | (JP) . |
| 6-211836 | | 8/1994 | (JP) . |
| 6-215775 | * | 8/1994 | (JP) . |
| 8-298136 | * | 11/1996 | (JP) . |
| 8-321307 | | 12/1996 | (JP) . |
| 10-106579 | | 4/1998 | (JP) . |
| 10-154512 | | 6/1998 | (JP) . |
| 10-289617 | | 10/1998 | (JP) . |
| 11-67211 | | 3/1999 | (JP) . |
| 11-126610 | * | 5/1999 | (JP) . |
| 11-288740 | * | 10/1999 | (JP) . |
| 3039484 B2 | | 3/2000 | (JP) . |

OTHER PUBLICATIONS

E.S. Matveeva, "Could the Acid Doping of Polyaniline Represent the Charge Transfer Interaction?", pp. 1–8, *Synthetic Metals*, (83 (1996) 89–96).

* cited by examiner

*Primary Examiner*—Carol Chaney
*Assistant Examiner*—Susy Tsang
(74) *Attorney, Agent, or Firm*—Young & Thompson

(57) ABSTRACT

An electrode for a secondary or rechargeable battery using a conducting polymer as an active material is provided, which realizes a large capacity, a good cycling property, and a high power density. This electrode is comprised of an active material layer having an active material made of a mixture of a nitrogen-containing compound polymer and a quinone-system compound. The molar ratio of the nitrogen-containing compound polymer and the quinone-system compound is preferably in the range of 0.25:0.75~0.75:0.25 and is more preferably in the range of 0.33:0.66~0.66:0.33. The active material of the electrode is produced by using a mixture of powders of the nitrogen-containing compound polymer and the quinone-system compound.

2 Claims, 10 Drawing Sheets a: Theoretical Capacity
b: Appeared Initial Capacity
c: Appeared Capacity after 100 cycles

COMPOSITE ELECTRODE FOR SECONDARY BATTERY AND PRODUCTION METHOD THEREOF

BACKGROUND OF THE INVENTION

1. Field of the Invention

The present invention relates to a composite electrode for a secondary battery and a production method thereof and more particularly, to a composite electrode for a rechargeable battery that improves the capacity, cycling performance, and power density, and a production method of the electrode.

2. Description of the Prior Art

In recent years, various research and development have been vigorously performed for the purpose of realizing a light-weight, high output-density secondary battery using the electrochemical doping and dedoping property of a conducting polymer such as polyacetylene and polyaniline.

An example of the conventional secondary batteries of this sort uses polyaniline (Pan) as a positive electrode and metallic lithium (Li) as a negative electrode. In this secondary battery, the reactions at the positive and negative electrodes (i.e., electrode reactions) during the charging process are expressed in the following chemical equations (1a) and (2a) respectively.

$$Pan + nClO_4^- + nH^+ \rightarrow Pan(ClO_4)_n + ne^- + nH^+ \quad (1a)$$

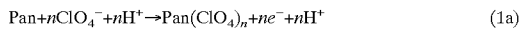

$$Li^+ + e^- \rightarrow Li \quad (2a)$$

During the discharging process, the electrode reactions are expressed in the following chemical equations (1b) and (2b), respectively, which are reverse of the equations (1a) and (2a).

$$Pan + nClO_4^- + nH^+ \leftarrow Pan(ClO_4)_n + ne^- + nH^+ \quad (1b)$$

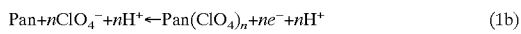

$$Li^+ + e^- \leftarrow Li \quad (2b)$$

As seen from the equations (1a) and (1b), in the reactions at the positive electrode, the doping and dedoping processes of a dopant anion (here, $ClO_4^{31}$) are used as the battery reaction, i.e., redox reaction.

In the equations (1a) and (1b), n is the doping rate of the dopant anion, $ClO_4^-$. It has been known that the doping rate n is equal to 0.5 or less, in other words, the maximum value of n is 0.5 (=50%) for polyaniline.

The capacity C (mAh/g) of the active material (i.e., polyaniline) of the positive and negative electrodes are calculated by the following equation (3)

$$C = 26950 \times \left(\frac{N_{elec}}{M_r}\right) \quad (3)$$

where $N_{elec}$ is the number of reaction-participant electrons and $M_r$ is the molecular weight of the active material (i.e., polyaniline). Since polyaniline is a polymer material, the molecular weight of the monomer unit of polyaniline is used as the molecular weight $M_r$.

The monomer unit of polyaniline has a molecular weight $M_r$ of 92g. If the doping rate n of polyaniline is supposed to be 0.5 (=50%), the number $N_{elec}$ of reaction-participant electrons is equal to 0.5 In this case, the capacity C (mAh/g) of the active material (i.e., polyaniline) is given as 144 mAh/g from the equation (3).

In general, the doping and dedoping reactions (i.e., redox reaction) of the conducting polymers occur with good reversibility, the reason of which is as follows.

Specifically, the matrix of the conducting polymers has a more flexible structure than that of the inorganic materials. Therefore, the volumetric increase and decrease of the matrix will occur with good reversibility during the doping and dedoping processes of the dopant into the matrix.

The conventional secondary batteries using a conducting polymer such as polyaniline as the active material of the positive electrode have the following problems.

A first problem is that even if the active material (i.e., conducting polymer such as polyaniline) has a sufficient reversibility, the cycling property of the battery or positive electrode itself tends to disappear.

The reason of the first problem is explained below with reference to FIG. 1 illustrating a partial cross-section of the positive electrode of the conventional battery.

In FIG. 1, the positive electrode 106 is comprised of a plate-shaped conductive collector 101 and an active material layer 105. The active material layer 105 is fixed in contact with an opposing surface of the collector 101. The active material layer 105 contains a particulate active material (i.e., conducting polymer such as polyaniline) 102 and a particulate conductivity-imparting agent (e.g., carbon) 103, both of which are combine with a binder (not shown) to have a layer-shaped structure. A liquid electrolyte 104 containing $LiClO_4$ is permeated into the miniaturized pores of the active material layer 105.

The battery or redox reaction occurs between the active material 102 and the electrolyte 104 and thus, electrons are transferred between active material 102 and the electrolyte 104 through the collector 101 or the conductivity-imparting agent 103. Therefore, to realize a satisfactory cycling property of the electrode 106, no only the reversibility of the redox reaction of the active material (i.e., conducting polymer) 102 but also the electron conductivity among the conductivity-imparting agent 103, the collector 101, and the active material 102 need to be ensured.

When one of the known conducting polymers (e.g., polyaniline) is used as the active material 102, some volumetric increase or decrease (i.e., expansion or shrinkage) of the active material 102 will occur together with the battery reaction or the charging/discharging reactions. Specifically, when the dopant anion (e.g., $ClO_4^-$) is doped into the matrix of the active material (e.g., polyaniline) 102 to charge the battery, the volume of the active material 102 tends to expand. When the dopant anion (e.g., $ClO_4^-$) is dedoped from the matrix of the active material (i.e., polyaniline) 102 to discharge to battery, the volume of the active material 102 tends to shrink.

On the other hand, no expansion nor shrinkage occurs in the collector 101 during the charging and discharging processes. Accordingly, the contact resistance tends to increase at the contact areas of the active material layer 105 and the collector 101, thereby degrading or preventing the electron conductivity.

As a consequence, the cycling property of the battery or positive electrode 106 itself tends to disappear while the reversibility in the redox reaction of the active material 102 is kept sufficiently.

A second problem is that the capacity per volume is small. The reason is that the active material layer 105 using the conducting polymer such as polyaniline has a low density and therefore, the capacity per volume of the layer 105 becomes smaller than that of the known inorganic active material layers.

The capacity per weight and the capacity per volume of polyaniline, and $LiCoO_2$ and $LiMn_2O_4$ as examples of the inorganic active materials are listed in the following Table 1.

TABLE 1

| ACTIVE MATERIAL | DENSITY (g/dm$^3$) | CAPACITY PER WEIGHT (mAh/g) | CAPACITY PER VOLUME (mAh/dm$^3$) |
|---|---|---|---|
| LiCoO$_2$ | 5.1 | 137 | 698 |
| LiMn$_2$O$_4$ | 4.3 | 104 | 447 |
| POLYANILINE | 1.3 | 144 | 187 |

In Table 1, the following relationship is established as (CAPACITY PER VOLUME)=(CAPACITY PER WEIGHT)× DENSITY.

As seen from Table 1, although the capacity per weight of polyaniline is approximately equal to that of LiCoO$_2$ and LiMn$_2$O$_4$, the capacity per volume of polyaniline is smaller than that of LiCoO$_2$ and LiMn$_2$O$_4$ due to smallness of the density.

A third problem is that the power density is low.

The power density of the battery or electrode 106 is determined by the reaction rate of the redox reaction of the active material 102 and the diffusion rate of the reaction-participant ion in the liquid electrolyte 104. Since the diffusion rate of the reaction-participant ion is typically lower than the reaction rate of the redox reaction of the active material 102, the power density is dominated by the diffusion rate of the ions.

The diffusion rate of the reaction-participant ion in the electrolyte 104 increases with the decreasing radius of the ions. Therefore, it is preferred that the reaction-participant ion has a radius as small as possible.

In the previously-described equations (1a), (1b), (2a), and (2b) where the $ClO_4^{31}$ ions with a comparatively large radius are used as the reaction-participant ion, i.e., the dopant anion, the power density becomes low due to the low diffusion rate of the dopant anion.

SUMMARY OF THE INVENTION

Accordingly, an object of the present invention to provide an electrode for a secondary battery using a conducting polymer as an active material that realizes a large capacity, a good cycling property, and a high power density, and a fabrication method thereof.

Another object of the present invention is to provide a secondary battery using a conducting polymer as an active material for positive and/or negative electrodes that realizes a large capacity, a good cycling property, and a high power density, and a fabrication method thereof.

The above objects together with others not specifically mentioned will become clear to those skilled in the art from the following description.

According to a first aspect of the present invention, an electrode for a secondary battery is provided, which is comprised of a conductive member and an active material layer formed on the member. The active material layer has an active material containing a nitrogen-containing compound polymer and a quinone-system compound.

It is preferred that a molar ratio of the nitrogen-containing compound polymer and the quinone-system compound is 0.25:0.75~0.75:0.25.

It is more preferred that a molar ratio of the nitrogen-containing compound polymer and the quinone-system compound is 0.33:0.66~0.66:0.33.

According to a second aspect of the present invention, a production method of the electrode according to the first aspect is provided, which is comprised of a step (a) of making a powder mixture of a nitrogen-containing compound polymer and a quinone-system compound as an active material, and a step (b) of making a layer of the mixture on a conductive member, thereby forming an active material layer on the member.

In the step (a), the powder mixture of the nitrogen-containing compound polymer and the quinone-system compound may be made by mixing a powder of the nitrogen-containing compound polymer and a powder of the quinone-system compound or by powdering a mixture of the nitrogen-containing compound polymer and the quinone-system compound.

In the step (b), any process or method may be used for making the layer of the mixture on the conductive member. A screen printing method is preferably used for this purpose.

According to a third aspect of the present invention, another production method of the electrode according to the first aspect is provided, which is comprised of a step (a) of preparing a nitrogen-containing compound polymer and a solution of a quinone-system compound, a step (b) of immersing the nitrogen-containing compound polymer into the solution of the quinone-system compound, a step (c) of removing a solvent of the solution to make a composite of the nitrogen-containing compound polymer and the quinone-system compound, and a step (d) of forming a layer of the composite on a conductive member, thereby producing an active material layer on the member.

In the step (b), any process or method may be used for immersing the nitrogen-containing compound polymer into the solution of the quinone-system compound if the composite of the nitrogen-containing compound polymer and the quinone-system compound can be made in the step (c).

In the step (c), any process or method may be used for removing the solvent of the solution to make the composite of the nitrogen-containing compound polymer and the quinone-system compound. Simply, the solvent of the solution may be removed by drying using heat.

In the step (d), any process or method may be used for making the layer of the composite on the conductive member. A screen printing method is preferably used for this purpose.

According to a fourth aspect of the present invention, still another production method of the electrode according to the first aspect is provided, which is comprised of a step (a) of preparing a nitrogen-containing compound an a quinone-system compound, a step (b) of polymerizing the nitrogen-containing compound in the presence of the quinone-system compound, thereby producing a composite of a nitrogen-containing compound polymer and the quinone-system compound, and a step (c) of making a layer of the composite on a conductive member, thereby producing an active material layer on the member.

In the step (b), any process or method may be used for polymerizing the nitrogen-containing compound in the presence of the quinone-system compound.

In the step (c), any process or method may be used for making the layer of the composite on the conductive member. A screen printing method is preferably used for this purpose.

According to a fifth aspect of the present invention, a secondary battery is provided, which is comprised of the electrode according to the first aspect as at least one of positive and negative electrodes.

As a liquid electrolyte permeated into the electrode, any electrolyte may be used if it has a proton source. For example, any water solution of an electrolyte or any non-water solution of an electrolyte containing a proton source may be used.

DETAILED DESCRIPTION OF THE INVENTION

The inventors of the present invention have made a thorough effort to solve the above first to third problems previously described in the "Description of the Prior Art". As a result of this, they have found that these problems can be solved by using a mixture or composite of a nitrogen-containing compound polymer and a quinone-system compound as an active material. The present invention was created based on the knowledge thus found.

FIG. 2 shows a partial cross-section of an electrode 6 for a secondary battery according to the present invention. Since FIG. 2 is a schematic illustration of the electrode 6 as an example, the electrode 6 need not always to have the structure shown in FIG. 2.

In FIG. 2, the electrode 6 according to the present invention is comprised of a plate-shaped conductive collector 1 and an active material layer 5. The active material layer 5 is fixed in contacted with an opposing surface of the collector 1. The active material layer 5 contains a particulate active material 2 and a particulate conductivity-imparting agent 3, both of which are combined with a binder (e.g., carbon, not shown here) to have a layer-shaped structure. A liquid electrolyte 4 is permeated into the pores of the active material layer 5.

The electrode 6 is used as at least one of positive and negative electrodes (i.e., anode and cathode). The positive and negative electrodes are opposed to one another through a separator, thereby forming a secondary battery.

In the present invention, the material and shape of the conductive collector 1 are not limited. Any material and any shape may be applied for the collector 1. Preferably, a conductive sheet or plate made of metal or conductive polymer material is used. The conductive polymer material is typically produced by adding a conductivity-imparting agent (e.g., carbon) with electron conductivity to a non-conductive polymer material such as polystyrene.

The active material 2 is a composite or mixture of a nitrogen-containing compound polymer and a quinone-system compound. Therefore, the electrode according to the present invention may be termed a "composite electrode".

As the nitrogen-containing compound polymer, any polymer of a nitrogen-containing compound may be used. As the nitrogen-containing compound, any aromatic compound containing nitrogen, such as aniline, pyridine, and pyrimidine may be used. In other words, any nitrogen-containing aromatic compound polymer (which is a conducting polymer also) such as polyaniline, polypyridine, and polypyrimidine may be used as the nitrogen-containing compound polymer.

As the quinone-system compound, any compound containing a quinone group, such as benzoquinone and anthraquinone may be used.

It is preferred that a molar ratio of the nitrogen-containing compound polymer and the quinone-system compound is 0.25:0.75~0.75:0.25. If the molar ratio of the nitrogen-containing compound polymer is less that 0.25, there is a possibility that the cycling property is not improved. If the molar ratio of the nitrogen-containing compound polymer is greater that 0.75, there is a possibility that the capacity is decreased.

It is more preferred that a molar ratio of the nitrogen-containing compound polymer and the quinone-system compound is 0.33:0.66~0.66:0.33. Within this range, the advantages of the present invention are ensured.

Next, the electrode reaction or redox reaction of the electrode 6 is explained below under the condition that polyaniline is used as the nitrogen-containing compound polymer and benzoquinone is used as the quinone-system compound. In this case, the electrode 6 is termed the polyaniline/benzoquinone electrode in the following explanation.

FIG. 3 shows the charging and discharging reactions in the polyaniline/benzoquinone electrode 6. In FIG. 3, the reference numeral 7 denotes a unit or monomer of polyaniline and the reference numerals 8a and 8b denotes a unit or monomer of benzoquinone.

In. FIG. 3, an arrow a indicates the charging process of the electrode 6 and an arrow b indicates the discharging process thereof.

The benzoquinone in the electrode 6 are oxidized and reduced by the adjoining polyaniline during the charging and discharging processes, thereby accelerating the redox or electrode reaction.

Specifically, in the charging process, the reaction progresses along the arrow a. In this process, two electrons (2e) are moved from an oxygen (O) atom in the monomer 8a of the benzoquinone to a nitrogen (N) atom in the monomer 7 of the polyaniline, as shown by an arrow c. Thus, the monomer 8a of the benzoquinone is oxidized and transformed to the monomer 8b and at the same time, hydrogen (H) atoms in the monomer 8a of the benzoquinone are ionized, thereby generating two protons ($2H^+$).

On the other hand, in the discharging process, the reaction progresses along the arrow b. In this process, the two electrons (2e) are added from the nitrogen (N) atom in the monomer 7 of the polyaniline to the oxygen (O) atom in the monomer 8b of the benzoquinone, as shown by an arrow d. Thus, the monomer 8b of the benzoquinone is reduced and transformed to the monomer 8a and at the same time, two protons ($2H^+$) in the monomer 8b of the benzoquinone are de-ionized, resulting in the hydrogen (H) atoms.

Actually, the oxygen (O) atoms are bonded to the nitrogen (N) atoms. However, their bonding structure is not illustrated in FIG. 3 for simplification.

The benzoquinone in the electrode 6 is bonded to the polyaniline with the use of the hydrogen (H) bonds. Thus, the benzoquinone is fixed to the electrode 6 and as a result, it is suppressed to diffuse into the liquid electrolyte 4.

To investigate the diffusion suppressing effect for the benzoquinone due to addition of the polyaniline, benzoquinone electrodes (which contains benzoquinone only) and polyaniline/benzoquinone electrodes (which contains a composite of polyaniline and benzoquinone) were actually produced. Then, the time-dependent change of the conductance was measured while the benzoquinone electrodes and the polyaniline/benzoquinone electrodes thus produced were immersed into pure water for a specific time. As a consequence, a measurement result shown in FIG. 4 was presented.

As clearly seen from FIG. 4, the time-dependent change of the conductance of the polyaniline/benzoquinone electrodes is slower or gentler than that of the benzoquinone electrodes, the reason of which is as follows.

In the polyaniline/benzoquinone electrodes, the nitrogen (N) atoms of the polyaniline are bonded to the quinone groups of the benzoquinone through the hydrogen (H) bonds, Consequently, the water-soluble benzoquinone is fixed to the polyaniline/benzoquinone electrodes. On the other hand, the benzoquinone has a property to diffuse into the liquid electrolyte 4 in the benzoquinone electrodes.

Although the above explanation is made for the polyaniline/benzoquinone electrodes, the same explanation as above is applied to a composite of any other nitrogen-containing compound polymer than polyaniline and any other quinone-system compound than benzoquinone.

Since the electrode for a secondary battery according to the invention has the above-described configuration, they have three advantages described below.

(1) Cycling Property Improvement

A first advantage of the electrode according to the invention is improvement in cycling property. This is due to the fact that (i) the proton reaction is used for decreasing the volumetric change of the active material and that (ii) the diffusion or removal of the quinone-system compound such as benzoquinone into the electrolyte is suppressed by addition of the nitrogen-containing compound polymer such as polyaniline.

When the size or radius of the reaction-participant ion is large, the volumetric change of the matrix of the nitrogen-containing compound polymer is large. In this case, even if the cycling property of the active material is kept alive, the contact resistance of the active material at the contact areas of the active material to a collector or the like increases, so that the cycling property or lifetime of the electrode or battery disappears.

To solve this problem, it is effective to use a proton ($H^+$) with a small ion radius, the reason of which is as follows.

Since a proton has a small ion radius, the volumetric change of the matrix of the nitrogen-containing compound polymer due to absorption and desorption of the proton is suppressed. As a result, the increase of the contact resistance of the active material is suppressed.

In the electrode according to the present invention, to enable the use of a proton as the reaction-participant ion, a composite material made of a nitrogen-containing compound polymer and a quinone-system compound is used for the active material, where each of the nitrogen-containing compound polymer and the quinone-system compound is capable of generating a proton or protons. The use of this composite material improves the cycling property of the battery.

When an electrode is which only quinone-system compound is used as the active material, the quinone-system compound tends to diffuse into the liquid electrolyte during every charging/discharging cycle, resulting in separation of the quinone-system compound from the electrode. Thus, the capacity decreases and an obtainable cycling property becomes unsatisfactory.

According to the invention's tests, addition of the nitrogen-containing compound polymer to the quinone-system compound suppresses the separation of the quinone-system compound from the electrode, thereby improving the cycling property of the electrode. This is because the nitrogen (N) atoms in the nitrogen-containing compound polymer and the oxygen (O) atoms in the quinone-system compound are bonded together by the hydrogen (H) bonds.

(2) Capacity Improvement

A second advantage of the electrode according to the invention is improvement in capacity. This is due to the fact that the quinone-system compound causes a two-electron reaction.

Specifically, as seen from the above equation (3), to increase the capacity C (mAh/g) of the active material, it is effective to increase the number $N_{elec}$ of the reaction-participant electrons and/or to decrease the molecular weight $M_r$ of the active material.

As known well, the quinone-system compound causes a two-electron reaction per molecule. Therefore, the quinone-system compound has a much larger capacity c than that of a lot of materials causing one-electron reaction per molecule such as polyaniline.

As an example, a two-electron reaction of benzoquinone is shown in FIG. 5. The reaction progresses along an arrow a in a charging process and it progresses along an arrow b in a discharging process.

In the charging process, a molecule 8a of benzoquinone is oxidized to be transformed to a molecule 8b and at the same time, two protons ($H^+$) and two electrons ($e^-$) are produced. On the other hand, in the discharging process, the molecule 8b of benzoquinone is reduced or de-oxidized to be transformed to the molecule 8a and at the same time, the protons ($H^+$) and the electrons ($e^-$) disappear.

The molecule 8a of benzoquinone has a molecular weight $M_r$ of 108. Therefore, using the previously-described equation (3), the capacity C per weight is calculated as 499 mAh/g and the capacity C per volume is calculated as 520 mAh/g. The large value of 520 mAh/g of the capacity C per volume is approximately equal to that of the inorganic active materials listed in Table 1.

However, the quinone-system compound has no electron conductivity and tends to diffuse into the liquid electrolyte during the use of the electrode. In other words, if the active material is made of the quinone-system compound alone, there arises a disadvantage that the initial performance of the battery will degrade remarkable according to the operating time. Therefore, the quinone-system compound needs to be fixed to the inside of the electrode by some means.

To cope with this requirement, in the present invention, the quinone-system compound is used with the nitrogen-containing compound polymer to thereby form a composite of the quinone-system compound and the nitrogen-containing compound polymer. In this case, hydrogen (H) bonds are formed between the oxygen (O) atoms in the quinone-system system compound and the nitrogen (N) atoms in the nitrogen-containing compound polymer, thereby bonding the low-molecular quinone-system compound to the high-molecular nitrogen-containing compound polymer. Thus, the quinone-system compound is able to be fixed to the inside of the electrode.

As described above, the quinone-system compound having a large capacity per volume is effectively used to realize an electrode for a secondary battery and a secondary battery equipped therewith.

(3) Power Density Improvement.

A Third advantage of the electrode according to the invention is improvement is power density. This is due to the fact that (i) a proton ($H^+$) having a high diffusion rate in a liquid electrolyte is used as the reaction-participant ion and that (ii) the redox reaction of the quinone-system compound is accelerated due to addition or combination of the nitrogen-containing compound polymer.

Specifically, to improve the power density, the ion diffusion rate in a liquid electrolyte needs to be high. This means that small-sized ions having a small radius are preferably used for this purpose. From this view point, a most preferred ion for this purpose is a proton ($H^+$). This is because the proton ($H^+$) has a higher diffusion rate than those of alkaline metal ions and alkaline earth metal ions.

As a material enabling the use of a proton ($H^+$), the nitrogen-containing compound polymer is used in the present invention. However, if only the nitrogen-containing compound polymer is used, an obtainable capacity is unsatisfactorily small. On the other hand, as described previously, if only the quinone-system compound having a large capacity is used, the initial performance of the electrode is unable to be kept at a specific satisfactory level or higher due to the diffusion of the quinone-system compound into the electrolyte.

Accordingly, in the present invention, the nitrogen-containing compound polymer and the quinone-system compound are combined together, thereby fixing the quinone-system compound to the nitrogen-containing compound polymer and suppressing the diffusion of the quinone-system compound. As a result, a large power density is obtained due to the high diffusion rate of a proton ($H^+$).

Also, because of the addition or combination of the nitrogen-containing compound polymer, the redox reaction of the quinone-system compound as shown in FIG. 5, (i.e., the charging and discharging reactions of the electrode) is accelerated. In other words, this is due to the fact that an electron transferring and receiving interaction occurs between the nitrogen (N) atoms in the nitrogen-containing compound polymer and the quinone groups in the quinone-system compound.

Any electrolyte may be used for the present invention if it contains a proton source. Simply, a water solution of an electrolyte such as para-toluenesulfonic acid is used, because water serves as the proton source. However, any non-water solution (or, organic solution) of an electrolyte may be used for the invention if it generates a proton or protons.

BRIEF DESCRIPTION OF THE DRAWINGS

In order that the present invention may be readily carried into effect, it will now be described with reference to the accompanying drawings.

EXAMPLES

Preferred examples of the present invention and comparative examples will be described below.

First Example

First, a mixture of a nitrogen-containing compound polymer and a quinone-system compound was prepared in the following way.

Figure 8:
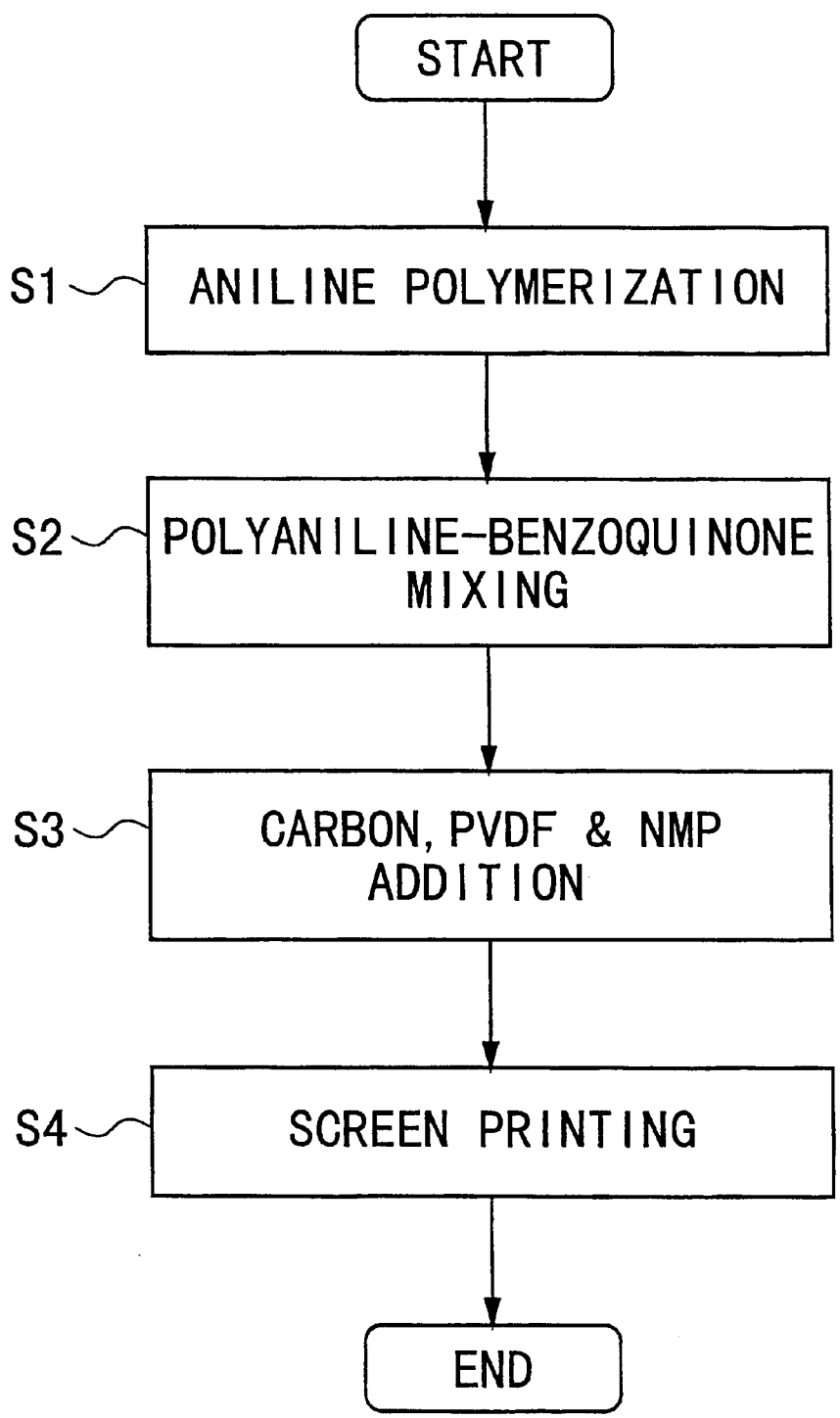
FIG. 8 is a flowchart showing a production method of the electrode according to the present invention in its first example.

An ethanol solution of 2 molar (M) para-toluenesulfonic acid and iron was dropped into a water solution of 1 M aniline and then, it was left at room temperature for 5 hours to polymerize the aniline (step S1 in FIG. 8). The aniline water solution thus prepared was filtered in a vacuum atmosphere and the filtered material was cleaned with the use of methanol. Thus, a black powder of polyaniline (i.e., a nitrogen-containing compound polymer) doped with para-toluenesulfonic acid was made.

The electrical conductivity of the polyaniline powder was 15 S/cm, which was measured by a four-point probe method.

The doping rate of polyaniline was 0.37 and a theoretical capacity thereof was 106.6 mAh/g, which were given by an element analysis and the above equation (3).

Next, 1 mol of the polyaniline powder thus generated was mixed with 1 mol of a benzoquinone powder (i.e., a quinone-system compound) in an agate mortar, thereby generating a powder mixture (or, composite powder) of polyaniline and benzoquinone (step S2 in FIG. 8). Therefore, this method is termed the "mixing method". The theoretical capacity of the mixture was 307 mAh/g.

The powder mixture or composite powder of polyaniline and benzoquinone was used as an active material.

Subsequently, to form a positive electrode, the powder mixture of polyaniline and benzoquinone was mixed with carbon serving as a conductivity-imparting agent and polyvinylidene difluoride (PVDF) serving as a binder in an agate mortar while their weights are set to satisfy the ratio of mixture:carbon:PVDF=60:20:20. Further, normal methyl pyrrolinone (NMP) was added to the mixture and then, the mixing behavior was continued until the PVDF was completely solved, thereby generating a flowable mixture of polyaniline, benzoquinone, carbon, NMP, and PVDF (step S3 in FIG. 8).

Thereafter, the flowable mixture was printed on a conductive sheet serving as a collector by a screen printing method, thereby forming an active material layer with a square shape of 2 cm×2 cm (step S4 in FIG. 8).

The active material on the collector was placed in a vacuum thermostatic chamber for an hour, thereby vaporizing the NMP. In this process, the chamber was held at a temperature of 80° C. and a pressure of 50 Torr or less.

The resultant active material layer thus formed, which serves as the positive electrode, had a thickness of 100 µm and a weight of 42 mg.

The theoretical capacity of the positive electrode thus produced was 7.75 mAh/g.

Then, the positive electrode thus produced was placed in a glass beaker located in a bell jar and then, it was left for 30 minutes at a pressure of 40 Torr or less. A water solution of 1 M para-toluenesulfonic acid serving as a liquid electrolyte was supplied to the beaker, thereby immersing the liquid electrolyte into the pores of the positive electrode.

This immersing process is not always necessary, because the electrode is contacted with the water solution of para-toluenesulfonic acid in a casing after assembly.

On the other hand, a negative electrode was formed in the same way as described above for the positive electrode except that polypyridine was used as an active material. The active material layer formed on a collector had a square shape of 2 cm×2 cm, a thickness of 80 μm and a weight of 31 mg.

The theoretical capacity of the negative electrode thus formed was 10.72 mAh/g, which is greater than that (7.75 mAh/g) of the positive electrode.

Figure 1:
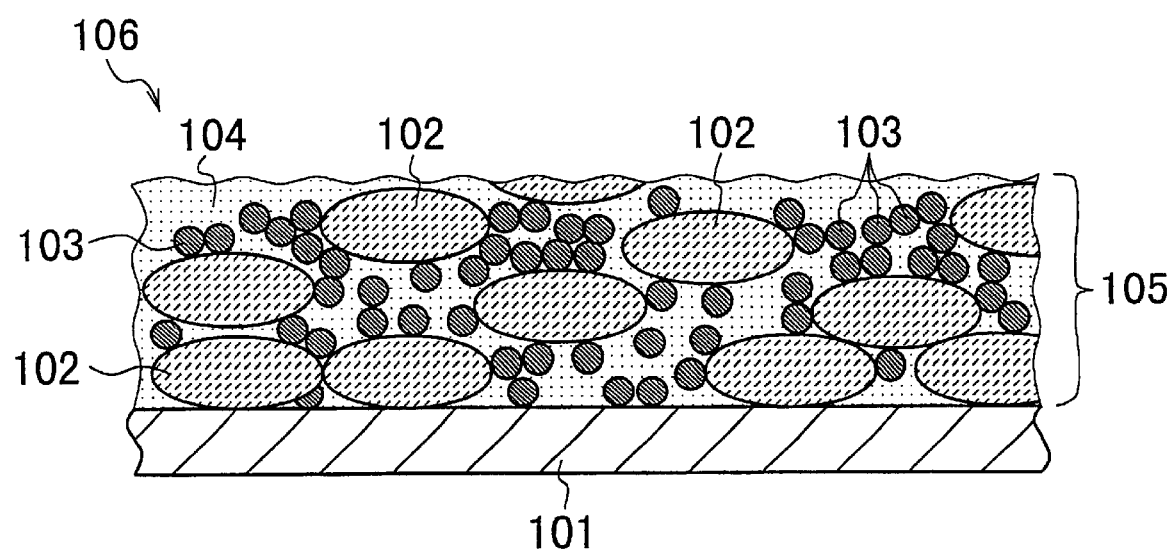
FIG. 1 is a partial, schematic, cross-sectional view of a positive electrode of a conventional secondary battery.
Figure 2:
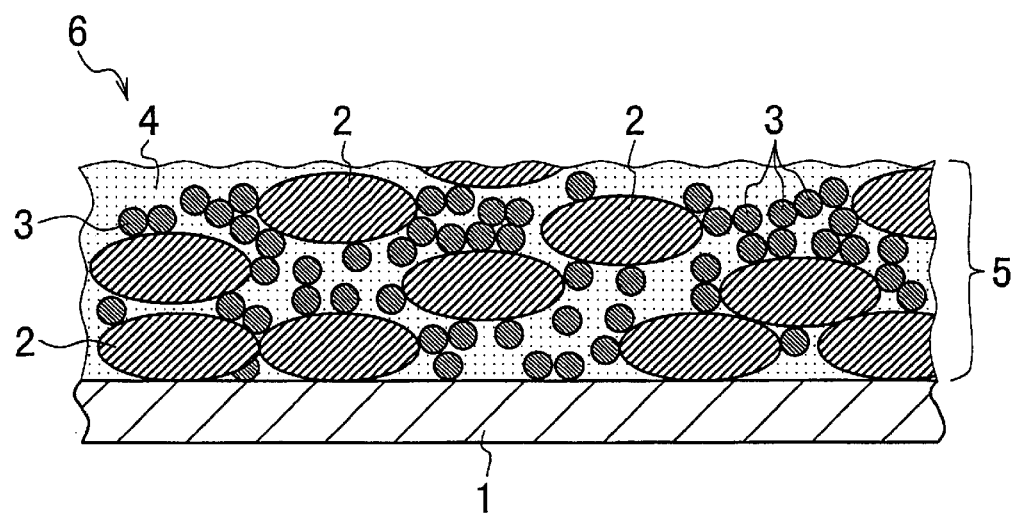
FIG. 2 is a partial, schematic, cross-sectional view of an electrode of a secondary battery according to the present invention.
Figure 3:
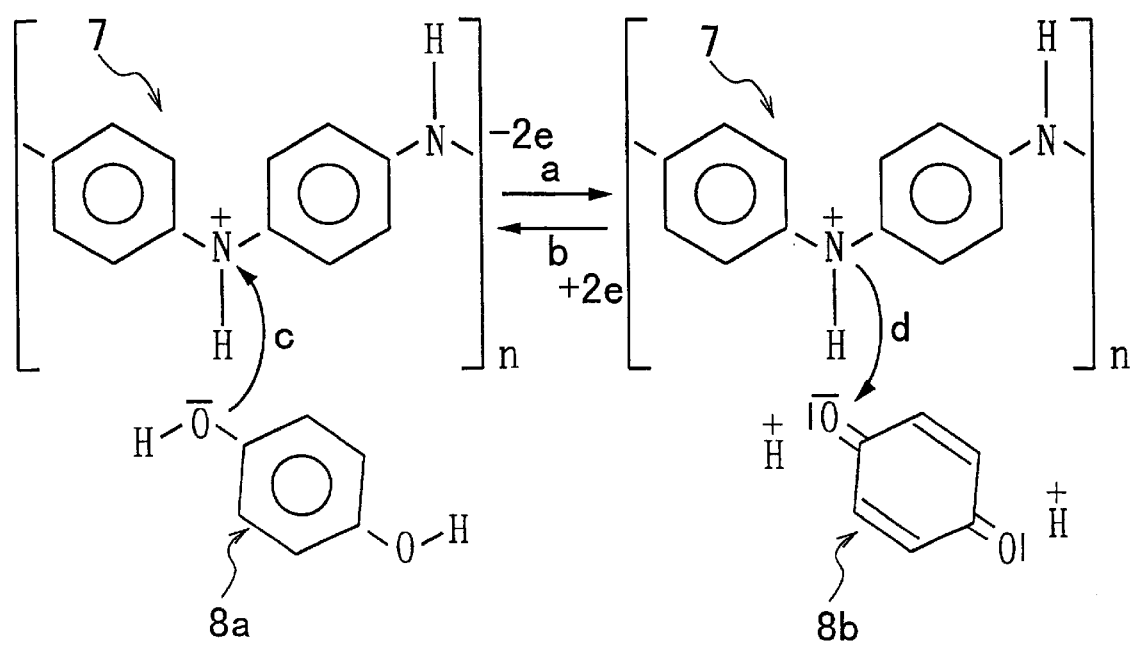
FIG. 3 is a schematic illustration showing the charging and discharging reactions at the electrode according to the present invention.
Figure 4:
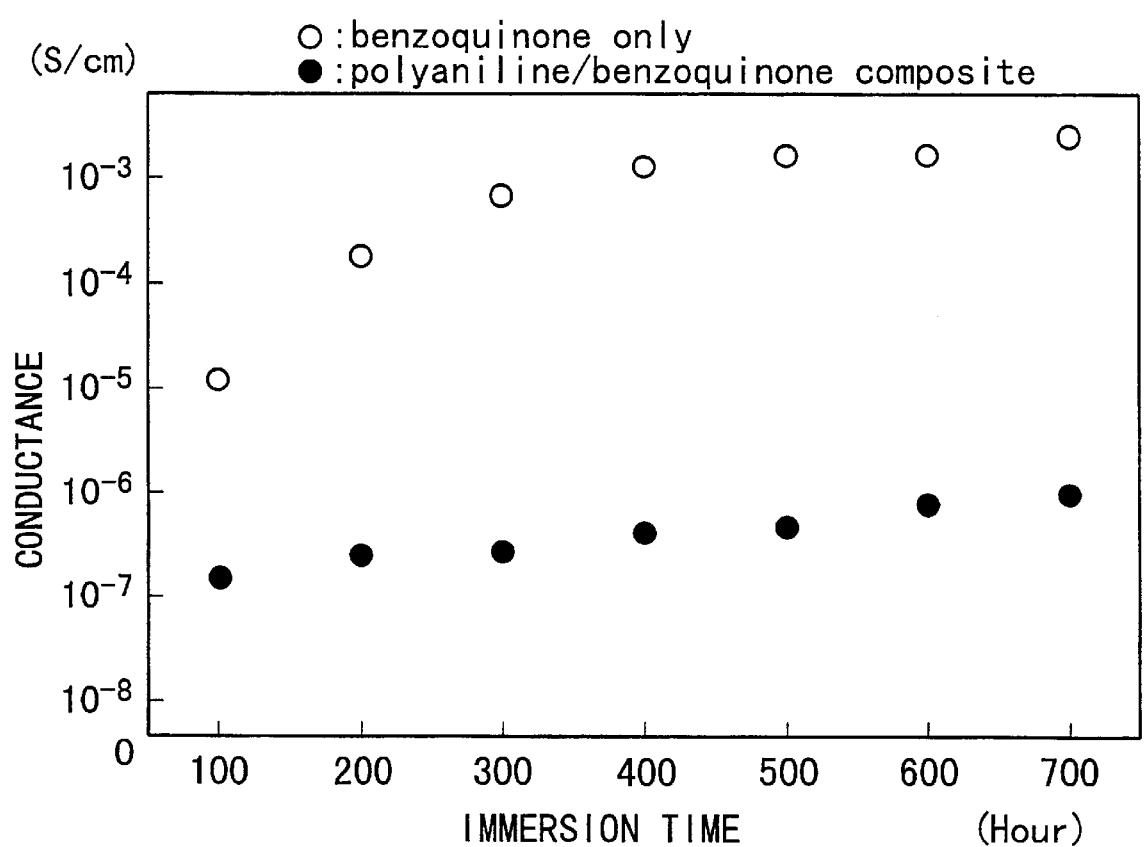
FIG. 4 is a graph showing the time-dependent change of the conductance of the conventional electrode and the inventive electrode according to the present invention.
Figure 5:
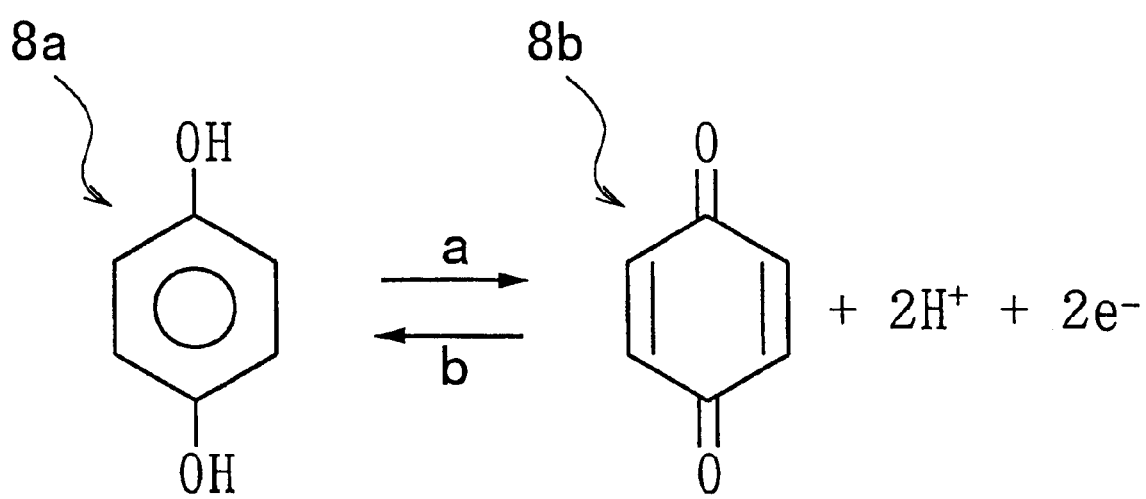
FIG. 5 is a schematic illustration showing the charging and discharging reactions at the electrode according to the present invention.
Figure 6:
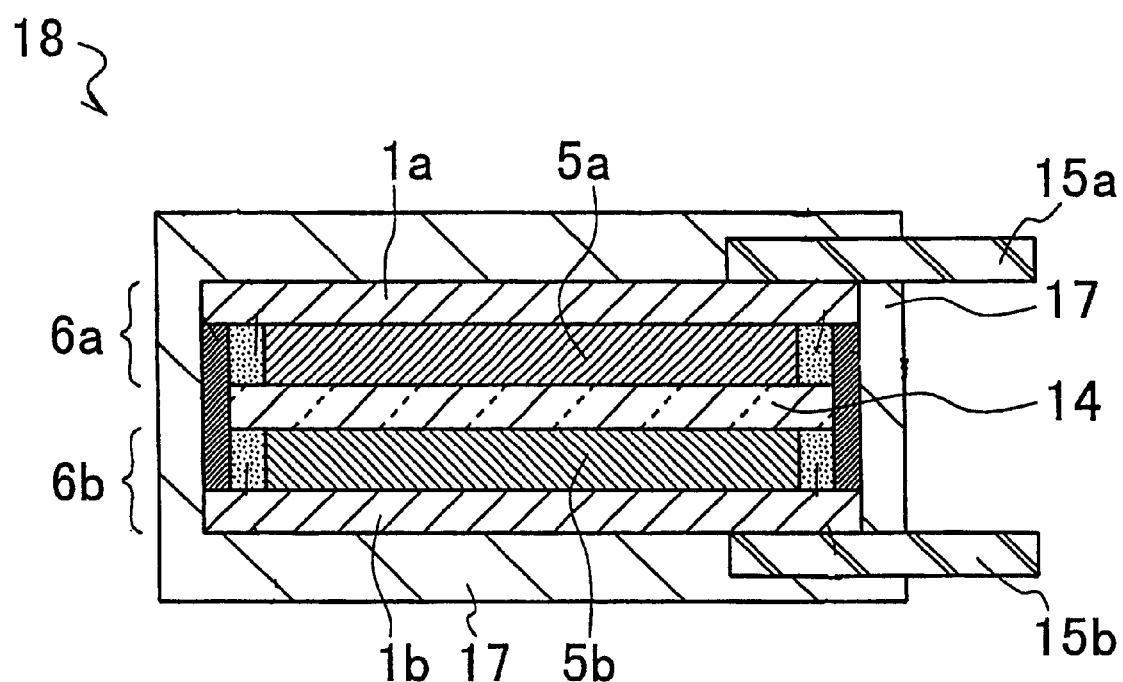
FIG. 6 is a schematic cross-sectional view of a secondary or rechargeable battery using the electrode according to the present invention.

After the above-described steps, a secondary battery 18 was assembled as shown in FIG. 6 using the positive and negative electrodes thus formed.

In FIG. 6, the reference numerals 1a and 1b denotes the collectors formed by the conductive sheets (which were made of conductive polystyrene), and the reference numerals 5a and 5b are active material layers, respectively. The active material layer 5a and the collector 1a constitute the positive electrode 6a. The active material layer 5b and the collector 1b constitute the negative electrode 6b.

The positive and negative electrodes 6a and 6b are placed to be opposed to one another in a rectangular-parallelepiped-shaped casing 17, and they are separated by a separator 14 made of propylene carbonate. A positive terminal 15a is contacted with the collector 1a in the casing 17 and electrically connected to the positive electrode 6a. A negative terminal 15b is contacted with the collector 1b in the casing 17 and electrically connected to the negative electrode 6b. The opposite ends of the positive and negative terminals 15a and 15b are protruded from the casing 17. The casing 17 is formed by an insulating material with no electron conductivity.

The inner space of the casing 17 was filled with the liquid electrolyte 4, i.e., the same water solution of 1M para-toluenesulfonic (pTS) acid as permeated into the active material layers 5a and 5b.

Since the theoretical capacity of the battery 18 is determined by a smaller one of the theoretical capacities of the positive and negative electrodes 6a and 6b, it was 7.75 mA/h equal to the capacity of the positive electrode 6a.

Three batteries having the above-described configuration were produced and then, they were subjected to the following three charging/discharging tests.

(1. capacity measurement)

The battery 18 was charged by supplying a constant voltage of 0.8 V for one hour and then, it was discharged under the condition of 1 C until the output voltage was 0.1 V, thereby illustrating a discharge curve. As appeared capacity of the battery 18 was obtained by the use of the discharge curve.

(2. cycle-property measurement)

The battery 18 was charged in the same as in the capacity measurement and then, it was discharged under the condition of 1 C until the output voltage was 0.4 V. The same charging and discharging processes were repeated while the capacity was measured at every discharge process. The second and later capacity data were compared with the initial capacity data.

(3. power-density measurement)

The battery 18 was charged in the same way as in the capacity measurement and then, it was discharged under the different conditions of 0.1 C, 1 C, 10 C, and 100 C. The capacity was measured at every discharge condition and compared with the data at 0.1 C.

The results of these three measurements in the first example are shown in Table 2.

First Comparative Example

In a first comparative example, a battery 18 was produced in the same way as that of the first example according to the present invention except that the active material layer 5a of the positive electrode 6a contains only polyaniline.

The above-described three-charging/discharging tests were performed in the same way as that of the first example.

The results of the measurements in the first comparative example are shown in Table 2.

Second Comparative Example

In a second comparative example, a battery 18 was produced in the same way as that of the first example according to the present invention except that the active material layer 5a of the positive electrode 6a contains only benzoquinone.

the above-described three charging/discharging tests were performed in the same way as that of the first example.

The results of the measurements in the second comparative example are shown in Table 2.

Second Example

Figure 9:
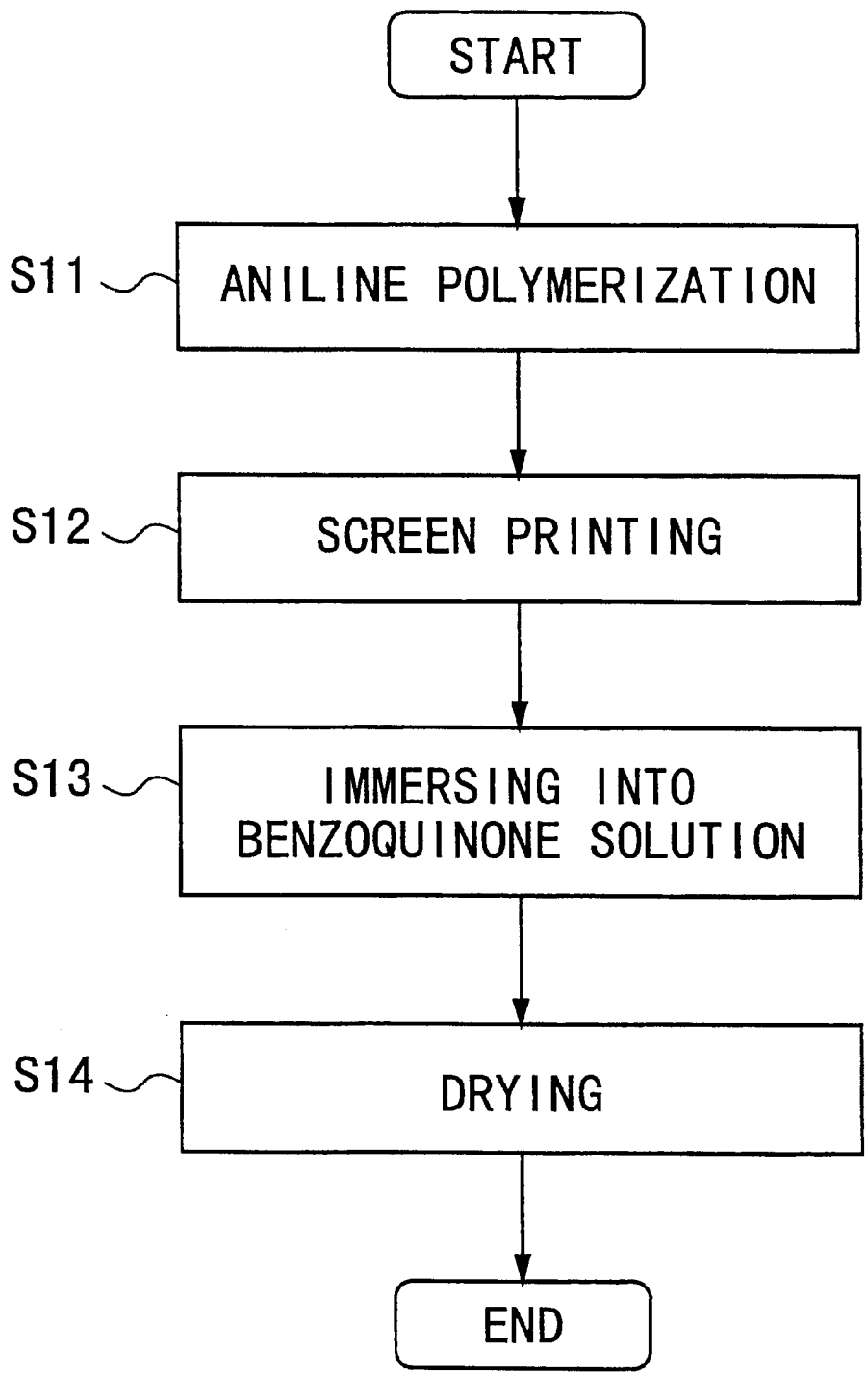
FIG. 9 is a flowchart showing another production method of the electrode according to the present invention in its second example.

In a second example according to the present invention, a polyaniline powder was produced and then, a layer was formed using the polyaniline powder on a collector 1a in the same way at that of the first example according to the present invention (steps S11 and S12 in FIG. 9). The layer thus formed contains polyaniline alone at this stage.

Next, the polyaniline layer was immersed into a water solution of 1 M benzoquinone and held for two hours at room temperature (step S13 in FIG. 9). Then, the polyaniline layer 5a was taken out of the water solution and vaporizes the water contained therein, thereby forming a composite active material layer 5a of polyaniline and benzoquinone (step S14 in FIG. 9). Thus, a positive electrode 6a formed by the polyaniline/benzoquinone active material layer 5a and the collector 1a was produced.

This method may be termed the "immersing method".

A negative electrode 6b was produced in the same way as the first example according to the present invention.

A battery 18 was produced in the same way as that of the first example using the positive electrode 6a with the polyaniline/benzoquinone active material layer 5a and the negative electrode 6b with polypyridine/benzoquinone active material layer 5b.

The above-described three charging/discharging tests were performed in the same way as that of the first example.

The results of the measurements in the second example are shown in Table 2.

As described above, the composite polyaniline/benzoquinone active material layer 5a of the positive electrode 6a was able to be produced by immersing a nitrogen-containing compound polymer (or, an active layer containing a nitrogen-containing compound polymer) into a solution of a quinone-system compound, instead of the mixing method used in the first example.

Third Example

Figure 10:
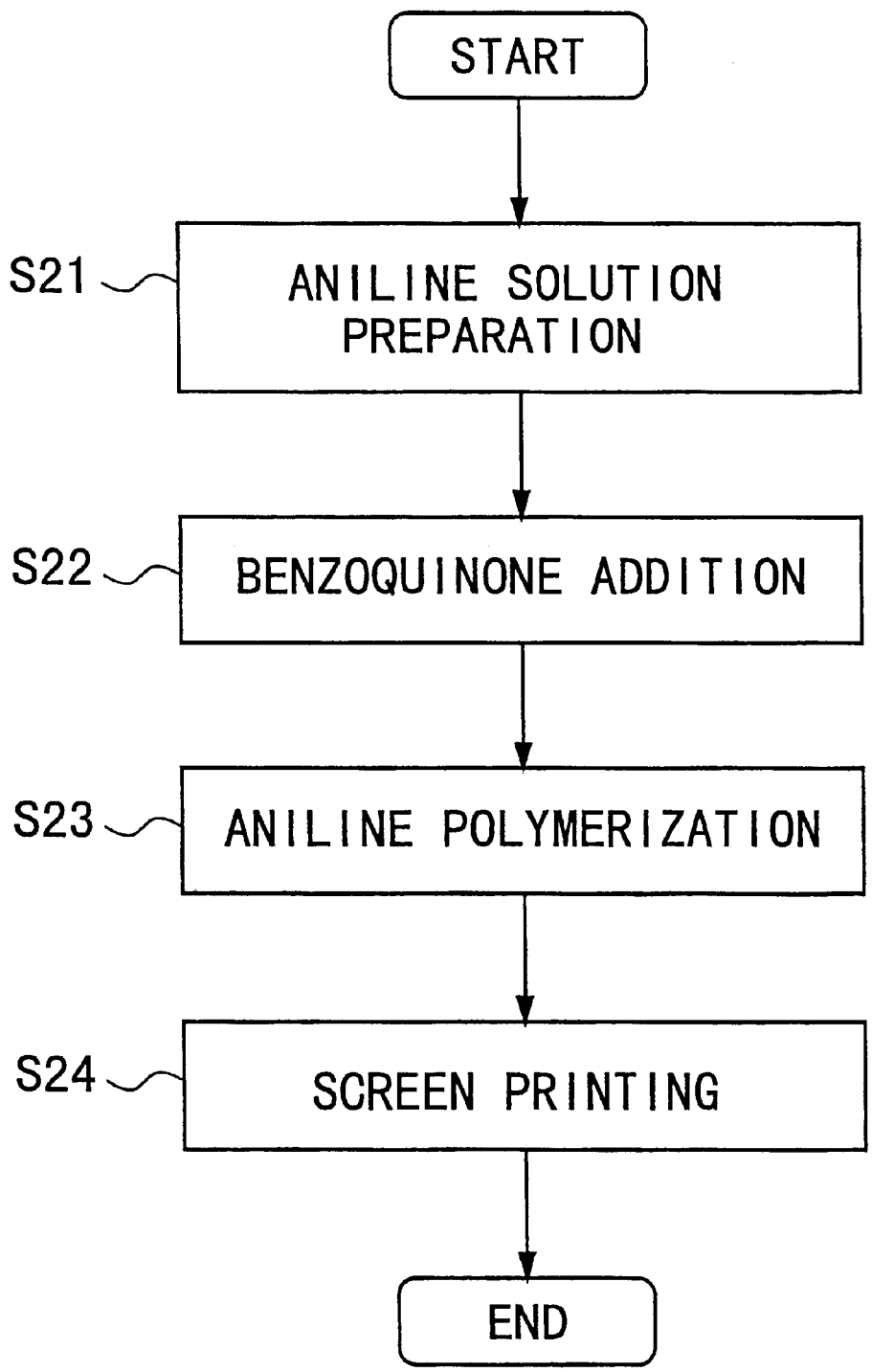
FIG. 10 is a flowchart showing still another production method of the electrode according to the present invention in its third example.

In a third example according to the present invention, benzoquinone was added to a polymerizing solution of aniline (i.e., an aniline water solution containing para-toluenesulfonic acid and iron, which was used in the first example) at a concentration of 1M to polymerize aniline, thereby generating polyaniline (steps S21 to S23 in FIG. 10). Thus, a composite polyaniline/benzoquinone active material layer 5a for the positive electrode 6a was produced. The other conditions were the same in the first example according to the present invention (step S24 in FIG. 10).

This method may be termed the "polymerizing method".

A negative electrode 6b was produced in the same way as the first example according to the present invention.

A battery 18 was produced in the same way as that of the first example using the positive electrode 6a with the above polyaniline/benzoquinone active material layer 5a and the negative electrode 6b with polypyridine/benzoquinone active material layer 5b.

The above-described three charging/discharging tests were performed in the same way as that of the first example.

The results of the measurements in the second example are shown in Table 2.

As described above, the composite polyaniline/benzoquinone active material layer 5a of the positive electrode 6a was able to be produced by polymerizing a nitrogen-containing compound (i.e., aniline) in the presence of a quinone-system compound (i.e., benzoquinone), instead of the mixing method used in the first example according to the present invention.

Figure 11:
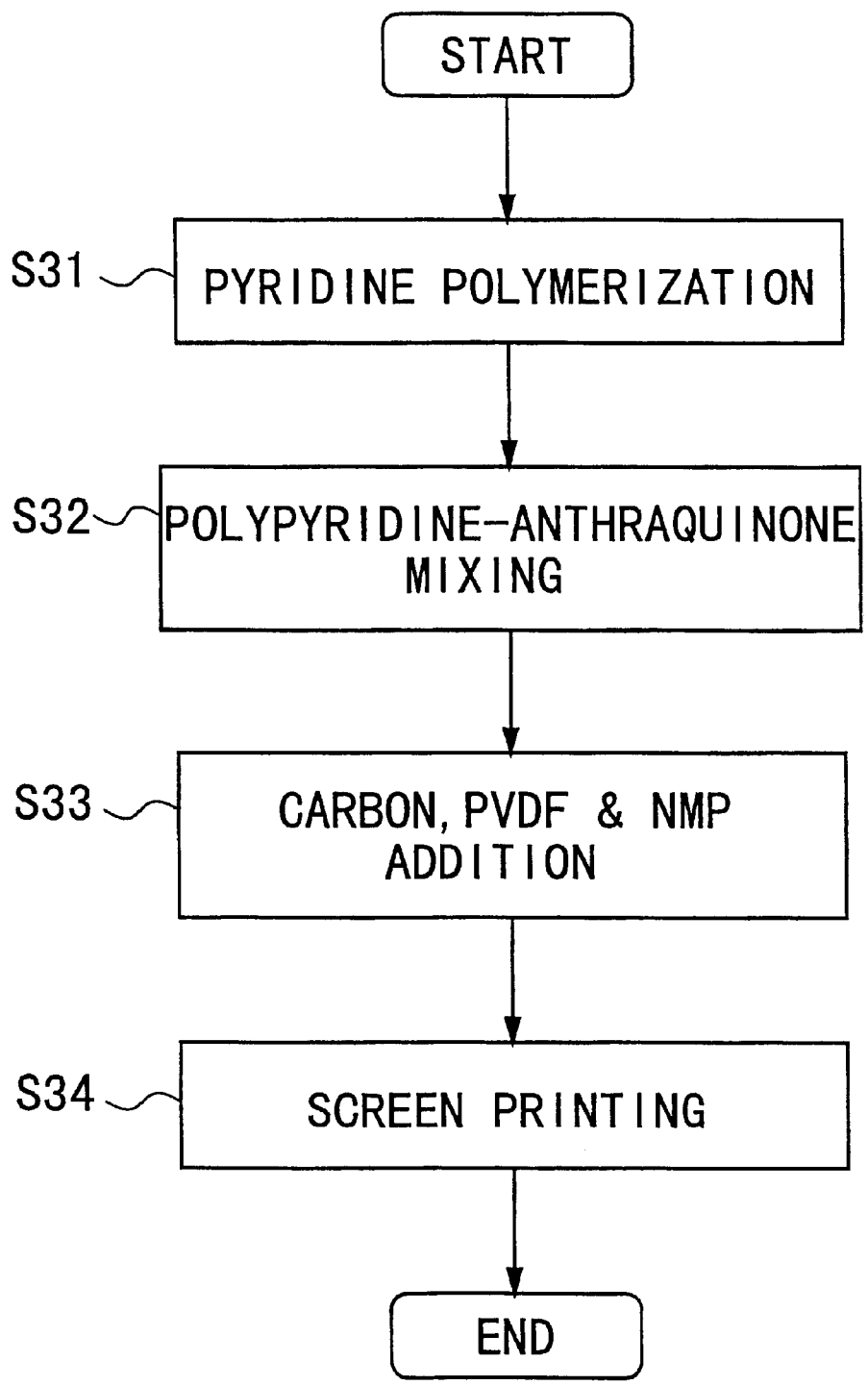
FIG. 11 is a flowchart showing a further production method of the electrode according to the present invention in its fourth example.

Fourth Example 1 mol of a polypyridine powder (i.e., a nitrogen-containing compound polymer) was mixed with 1 mol of an anthraquinone powder (i.e., a quinone-system compound) in an agate mortar, thereby generating a powder mixture of polypyridine and anthraquinone (steps S31 and S32 in FIG. 11). This method is termed the "mixing method".

The powder mixture of polypyridine and anthraquinone was used as an active material 5b for a negative 6b.

Next, to form the negative electrode 6b, the polypyridine/anthraquinone powder mixture was mixed with carbon serving as a conductivity-imparting agent and polyvinylidene difluoride (PVDF) serving as a binder in an agate mortar while the weight ratio of the polypyridine/anthraquinone powder mixture, carbon, and PVDF are set as 60:20:20.

Subsequently, normal methyl pyrrolinone (NMP) was added to the mixture and then, the mixing behavior was continued until the PVDF was completely solved, thereby generating a flowable mixture of polypyridine, anthraquinone, carbon, NMP, and PVDF (step S33 in FIG. 11).

Thereafter, the flowable mixture was printed on a conductive sheet serving as a collector 1b by a screen printing method, thereby forming an active material layer 1b with a square shape of 2 cm×2 cm (step (S34 in FIG. 11).

The active material on the collector 1b was placed in a vacuum thermostatic chamber for an hour, thereby vaporizing the NMP. In this process, the chamber was held at a temperature of 80° C. and a pressure of 50 Torr or less.

Thus, the negative electrode 6b with the composite polypyridine/anthraquinone active material layer 5b and the collector 1b was produced.

On the other hand, a positive electrode 6a with a composite polyaniline/benzoquinone active material layer 5a was produced in the same way as that of the first example.

A battery 18 was produced in the same way as that of the first example suing these positive and negative electrodes 6a and 6b thus produced.

The above-described three charging/discharging tests were performed in the same way as that of the first example according to the present invention.

The results of the measurements in the fourth example are shown in Table 2.

As described above, an aromatic compound with an aromatic ring containing nitrogen (N) such as polypyridine may be used in the present invention, instead of polyaniline.

Fifth Example

In a fifth example according to the invention, positive and negative electrodes 6a and 6b were produced in the same way as that of the first example according to the present invention.

Then, the positive and negative electrodes 6a and 6b thus produced were arranged to be opposite to one another in a casing 17 while a separator 14 is locate between the electrodes 6a and 6b. A propylene carbonate (PC) solution containing 1M trifluoroacetic acid ($CF_3COOH$) was used as a liquid electrolyte 4, instead of a water solution of para-toluenesulfonic acid used in the first example. Thus, a battery 18 was assembled.

The above-described three charging/discharging tests were performed in the same way as that of the first example according to the invention.

The results of the measurements in the fifth example are shown in Table 2.

As described above, when a non-water solution containing a proton source is used as the electrolyte 4, the same advantages as those in the first example were obtained.

As seen from Table 2, the discharging rate is lower than the first to fourth examples using a water solution containing a proton source. However, this is due to the difference in ion conductivity between the water and non-water solutions.

By comparing fifth example with a third comparative example described later, it is found that the battery 18 according to the fifth example as a higher discharging rate than the third comparative example.

Third Comparative Example

In a third comparative example, positive and negative electrodes 6a and 6b were produced in the same was as that of the first comparative example. Then, the positive and negative electrodes 6a and 6b thus produced were arranged to be opposite to one another in a casing 17 while a separator 14 is located between the electrodes 6a and 6b. A propylene carbonate (PC) solution containing 1M trifluoroacetic acid ($CF_3COOH$) was used as a liquid electrolyte 4. Thus, a battery 18 was assembled.

The above-described three charging/discharging tests were performed in the same way as that of the first example according to the invention.

The results of the measurements in the third comparative example are shown in Table 2.

As described above, it is seen from Table 2 that the batteries 18 of the first to fifth examples according to the present invention have a better total performance in all of the capacity, the cycling property, and the discharge rate compares with the first to third comparative examples.

TABLE 2

| | Positive Electrode | Negative Electrode | Method | ELECTROLYTE | $C_T$ | $C_A$ / $C_A$ (%) | CYCLE NUMBER | Dis. Rate (C) |
|---|---|---|---|---|---|---|---|---|
| E1 | polyaniline benzoquinone | polypyridine | Mix | pTS H$_2$O | 7.75 | 4.25 / 54.0 | 1000 | 100 |
| C1 | polyaniline | polypyridine | — | pTS H$_2$O | 3.21 | 1.01 / 31.6 | 1000 | 10 |
| C2 | benzoquinone | polypyridine | — | pTS | 6.54 | 2.00 / 30.6 | 100 | 0.1 |
| E2 | polyaniline benzoquinone | polypyridine | Imm. | PTS H$_2$O | 8.21 | 4.98 / 60.6 | 1200 | 100 |
| E3 | polyaniline benzoquinine | polypyridine | Pol. | PTS H$_2$O | 7.72 | 5.01 / 64.8 | 4000 | 100 |
| E4 | benzoquinone polyaniline | polypyridine anthraquinone | Mix | pTS H$_2$O | 3.12 | 1.21 / 38.8 | 800 | 10 |
| E5 | polyaniline benzoquinone | polypyridine | Mix | CF$_3$COOH PC | 8.01 | 6.32 / 78.9 | 3000 | 10 |
| C3 | polyaniline | polypyridine | — | CF$_3$COOH PC | 3.55 | 0.54 / 15.2 | 1600 | 0.1 |

In Table 2, the reference symbols E1, E2, E3, E4, and E5 denote the first to fifth examples of the present invention, and the reference symbols C1, C2, and C3 denote the first to third comparative examples, respectively.

Also, "$C_T$" is the theoretical capacity (mAh). "$C_A$" and "$C_A$ (%)" are the appeared initial capacity (mAh) and the "Rate (%)" of the appeared initial capacity $C_A$ to the theoretical capacity $C_T$, respectively. The "cycle number" is a number of repeated charging/discharging cycles until the capacity is lowered to the appeared initial capacity $C_A$. The "discharging rate (C)" is a rate where the appeared initial capacity $C_A$ is lowered to 60% of the appeared initial capacity $C_A$ in the discharging process at 0.1 C.

Sixth Example

In a sixth example according to the invention, batteries 18 were assembled in the same way as that of the first example according to the invention while changing the molar ratio of fraction of polyaniline and benzoquinone. Then, the same tests were performed in the same way as that of the first example and compared the capacity after 100 cycles with the initial capacity. Then result is shown in FIG. 7.

Figure 7:
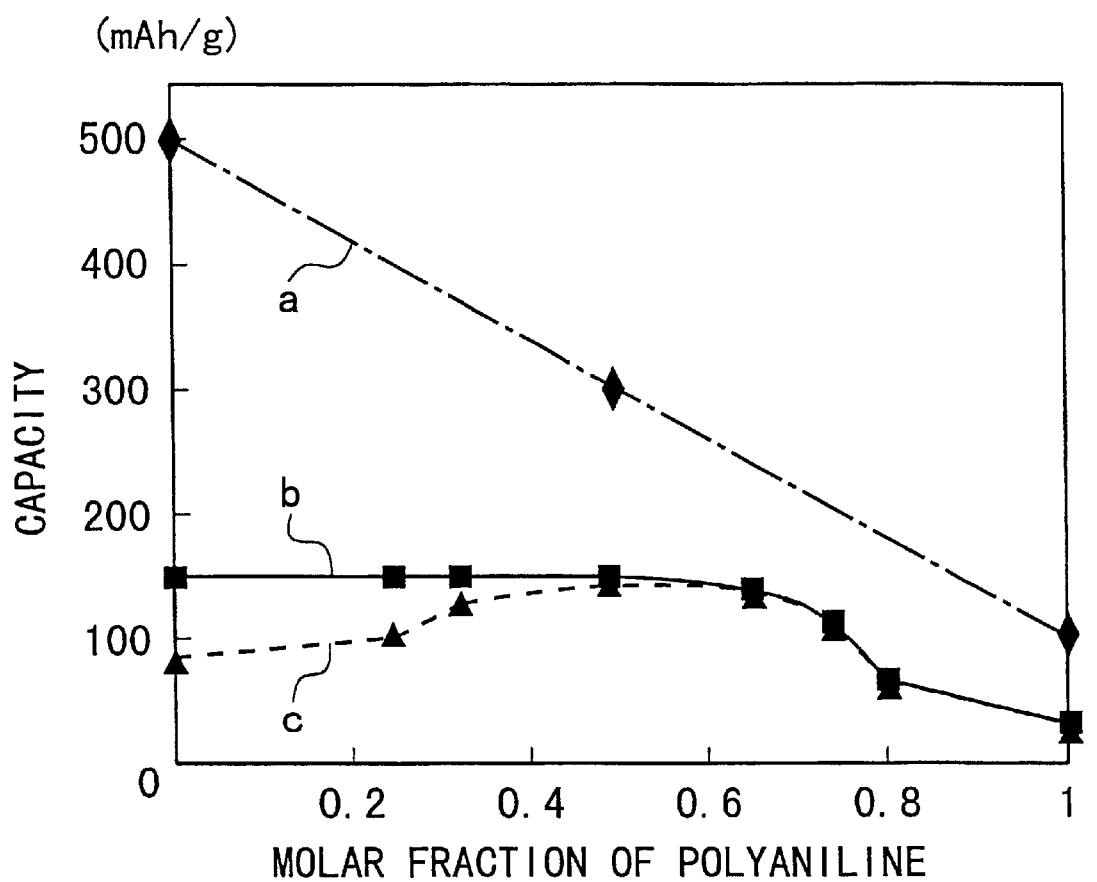
FIG. 7 is a graph showing the change of the capacity of the electrode according to the present invention as a function of the molar fraction of polyaniline.

In FIG. 7, the abscissa axis represents the molar fraction of polyaniline in the polyaniline/benzoquinone active material layer 5a of the positive electrode 6a.

When the molar fraction of polyaniline is zero, the layer 5a is made of only benzoquinone, which corresponds to the second comparative example. When the molar fraction of polyaniline is 0.5, the layer 5a is made of polyaniline and benzoquinone whose molar ratios are equal (i.e., 1:1), which corresponds to the first example according to the invention. When the molar fraction of polyaniline is unity, the layer 5a is made of only polyaniline, which corresponds to the first comparative example.

The theoretical capacity $C_T$ (mAh/g) (curve a) was calculated with the use of the equation (3). For example, when the molar fraction of polyaniline is zero, the theoretical capacity $C_T$ is equal to that of benzoquinone, i.e., 49 mAh/g. When the molar fraction of polyaniline is unity, the theoretical capacity $C_T$ is equal to that of polyaniline, i.e., 106 mAh/g.

As seen from FIG. 7, the theoretical capacity $C_T$ decreases with the increasing molar fraction of polyaniline. However, the appeared initial capacity $C_A$ (mAh/g) (curve b) is approximately constant in the range where the molar fraction of polyaniline is zero to 0.66 (2/3), and it decreases gradually in the range where the molar fraction of polyaniline is greater than 0.66 (2/3). Also, when the molar fraction of polyaniline is in the range from zero to approximately 0.75, the initial capacity $C_T$ is comparatively large.

Also, the difference between the appeared initial capacity $C_A$ and the capacity $C_{A100}$ after 100 cycles, i.e., the "decreasing rate" of the capacity, becomes lower with the increasing molar fraction of polyaniline. This is in accordance with the fact (i) the number of the repeated charge/discharge cycles was 100 or less to keep the initial capacity at a 60% level of the initial value or higher in the second comparative example, and that (ii) the number of the repeated charge/discharge cycles was 1000 or less to keep the initial capacity at a 60% level of the initial value or higher in the first comparative example.

It is seen from FIG. 7 that the molar fraction of polyaniline is preferably set as 0.25 or greater, and it is more preferably set as 0.33 or greater to reduce the decreasing rate of the capacity. Accordingly, it is preferred that the molar fraction of polyaniline is 0.25 to 0.75, and it is more preferred that the molar fraction of polyaniline is 0.33 to 0.66.

In the above first to sixth examples according to the invention, polyaniline is used as the nitrogen-containing compound polymer and benzoquinone is used as the quinone-system compound for the positive electrode 6a. However, it is needless to say that nay other nitrogen-containing compound polymer than polyaniline and any other quinone-system compound than benzoquinone may be used in the present invention. Also, any other electrolyte may be used in the present invention, if it has a proton source.

While the preferred examples of the present invention have been described, it is to be understood that modifications will be apparent to those skilled in the art without departing from the spirit of the invention. The scope of the invention, therefore, is to be determined solely by the following claims.

What is claimed is:

1. A production method of an electrode for a secondary battery, comprising the steps of:

(a) making a powder mixture of (1) a conductive nitrogen-containing polymer, said polymer having been formed from a nitrogen-containing aromatic monomer, and (2) a quinone-system compound;

(b) forming a layer of the mixture on a conductive member.

2. The method as claimed in claim 1, wherein said powder mixture of said nitrogen-containing polymer and said quinone-system compound is made by mixing a powder of said nitrogen-containing polymer and a powder of said quinone-system compound.

* * * * *